(12) United States Patent
Lee

(10) Patent No.: US 7,719,528 B2
(45) Date of Patent: May 18, 2010

(54) PORTABLE COMPUTER AND CONTROLLING METHOD THEREOF

(75) Inventor: Sung-eun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 642 days.

(21) Appl. No.: 10/930,946

(22) Filed: Sep. 1, 2004

(65) Prior Publication Data
US 2005/0156922 A1    Jul. 21, 2005

(30) Foreign Application Priority Data
Jan. 17, 2004    (KR) .................... 10-2004-0003538

(51) Int. Cl.
G09G 5/00    (2006.01)
(52) U.S. Cl. ....................... 345/211; 364/707
(58) Field of Classification Search ......... 713/320–324, 713/300; 361/693; 345/3.1, 211
See application file for complete search history.

(56) References Cited

U.S. PATENT DOCUMENTS

| | | | | |
|---|---|---|---|---|
| 5,303,171 | A * | 4/1994 | Belt et al. ................. | 713/321 |
| 5,410,711 | A * | 4/1995 | Stewart .................... | 713/322 |
| 5,630,142 | A * | 5/1997 | Crump et al. ............. | 713/323 |
| 5,884,085 | A * | 3/1999 | Sakai et al. ............... | 713/300 |
| 5,926,404 | A * | 7/1999 | Zeller et al. .............. | 713/321 |
| 5,987,613 | A * | 11/1999 | Busch et al. .............. | 713/300 |
| 6,044,473 | A * | 3/2000 | Kim ......................... | 713/320 |
| 6,243,819 | B1 * | 6/2001 | Jung ........................ | 713/320 |
| 6,704,194 | B2 * | 3/2004 | Koo ......................... | 361/683 |
| 2001/0022584 | A1 | 9/2001 | Tsugawa | |
| 2003/0051182 | A1 * | 3/2003 | Tsirkel et al. ............. | 713/320 |

FOREIGN PATENT DOCUMENTS

| | | |
|---|---|---|
| CN | 1221154 A | 6/1999 |
| JP | 6-332564 | 12/1994 |
| JP | 10-340148 | 12/1998 |
| JP | 2002-229684 | 8/2002 |
| JP | 2003-223246 | 8/2003 |
| KR | 2001-231712 | 5/2001 |
| KR | 2003-5960 | 1/2003 |

OTHER PUBLICATIONS

Chinese Office Action for Application No. 2005100019916 dated Jul. 7, 2006.
Korean Office Action issued Jan. 27, 2006.

* cited by examiner

*Primary Examiner*—Amare Mengistu
*Assistant Examiner*—Yuk Chow
(74) *Attorney, Agent, or Firm*—Staas & Halsey LLP

(57) ABSTRACT

A portable computer having a main body and a display panel hingedly attached to the main body, including an open/closed sensor to output open and closed detection signals in response to the display panel being open and closed, respectively; a power supply to supply a driving power to the display panel; and a controller to identify a predetermined power state in response to receiving the closed detection signal from the open/closed sensor, and to control the driving power to the display panel to be interrupted in response to the power state not being set to a low-power state.

15 Claims, 6 Drawing Sheets

PORTABLE COMPUTER AND CONTROLLING METHOD THEREOF

CROSS-REFERENCE TO RELATED APPLICATIONS

This application claims the benefit of Korean Patent Application No. 2004-3538, filed Jan. 17, 2004, in the Korean Intellectual Property Office, the disclosure of which is incorporated herein by reference.

BACKGROUND OF THE INVENTION

1. Field of the Invention

The present invention relates to a portable computer and a controlling method thereof, and, more particularly, a portable computer, and a controlling method thereof, which can reduce power consumption by interrupting the supply of power driving a display panel when a display is closed even if the low-power state is not configured.

2. Description of the Related Art

A general portable computer comprises a main body provided with a keyboard, a Floppy Disk Drive (FDD), etc., and a display attached by a hinge to the main body so as to open and close. Commonly, the display of the portable computer incorporates a flat display panel such as a Plasma Display Panel (PDP), Liquid Crystal Display (LCD), etc., which makes the portable computer easy to carry.

Such a portable computer is operated using electric power supplied from a DC adapter or a battery. However, when the portable computer is operated using the battery-supplied electric power, the allowable operating time is restricted to the battery life. Therefore, in order to extend the limited battery life and maximize the allowable operating time, accordingly achieved by the reduction in power consumed, various power saving measures have been proposed.

FIG. 6 is a flowchart illustrating a conventional power control when a display of a portable computer is closed.

Referring to FIG. 6, at operation 101, if the display of the conventional portable computer is closed, at operation 102 a driving power for a back-lit unit is interrupted. At operation 104, a MICOM (MIcro COMputer), a BIOS (Basic Input Output System), and an O/S (Operation System) sequentially determine whether the display of the portable computer is closed or not. Thereafter, a power management program in the O/S reads out a predetermined power state according to the closure of the display at operation 106, and places the portable computer into the power state corresponding to the predetermined power state at operation 108.

Herein, in a case in which the power state is set to a low-power state such as S3 (one level of standby in which minimal power is maintained) or S4 (hibernation), the O/S places the portable computer into the low-power state to achieve the reduction of power use.

Meanwhile, in a case in which the power state is not set to the low-power state, for example, S0 (fully active), S1 (another level of standby in which the display and drives are powered off), etc., only the driving power for the back-lit unit is interrupted.

Therefore, the driving power for the display panel is maintained and consumed even if the display of the portable computer is closed, that is, even if a user does not use the display for a while, although the portable computer does not need to supply the driving power for the display panel.

SUMMARY OF THE INVENTION

Accordingly, it is an aspect of the present invention to provide a portable computer and a controlling method thereof, which reduces the power consumed in the portable computer by interrupting the supply of a driving power for a display panel when a display is closed even if a low-power state is not set.

Additional aspects and/or advantages of the invention will be set forth in part in the description which follows and, in part, will be obvious from the description, or may be learned by practice of the invention.

The foregoing and/or other aspects of the present invention are achieved by providing a portable computer having a main body and a display panel hingedly attached to the main body, comprising an open/closed sensor to output open and closed detection signals in response to the display panel being open and closed, respectively; a power supply to supply a driving power to the display panel; and a controller to identify a predetermined power state in response to receiving the closed detection signal from the open/closed sensor, and to control the driving power to the display panel to be interrupted in response to the power state not being set to a low-power state.

The controller may control the driving power to the display panel to be supplied in response to receiving the open detection signal from the open/closed sensor and the power state not being set to the low-power state.

According to another aspect of the invention, a method of controlling a portable computer having a main body, and a display panel hingedly attached to the main body, comprises determining whether the display panel is closed or open; identifying a predetermined power state in response to the display panel being closed; and interrupting the supply of a driving power to the display panel in response to the power state not being set to a low-power state.

The method may further comprise determining whether the power state is set to the low-power state in response to the display being determined to be open; and supplying the driving power to the display panel in response to the power state not being set to the low-power state.

According to another aspect of the invention, a portable computer comprising a main body, a display panel hingedly attached to the main body, and a back-lit unit lighting the display panel, comprises an open/closed sensor to output open and closed detection signals in response to the display panel being open and closed, respectively; and a first and a second power supply to respectively interrupt the supply of a driving power to the display panel and the back-lit unit in response to receiving the closed detection signal from the open/closed sensor, and to respectively supply the driving power to the display panel and the back-lit unit in response to receiving the open detection signal from the open/closed sensor.

The portable computer may further comprise a time delayer to delay the closed detection signal for a predetermined first time interval and output the delayed closed detection signal to the first power supply to sequentially interrupt the respective driving powers to the back-lit unit and the display panel. The time delayer may further delay the open detection signal for a predetermined second time interval and output the delayed open detection signal to the second power supply to sequentially supply the respective driving powers to the back-lit unit and the display panel.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
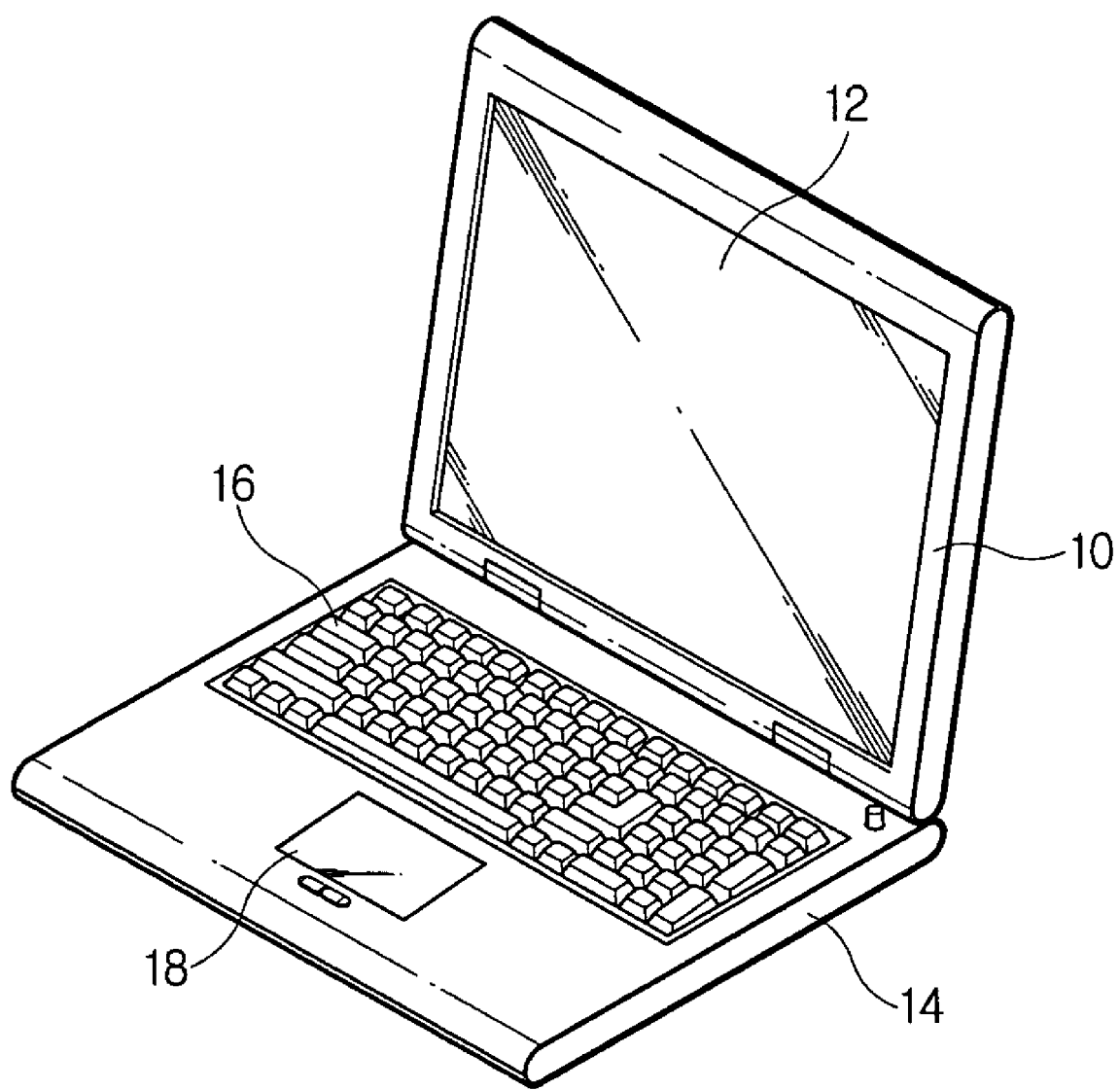
FIG. 1 is a perspective view of a portable computer according to an embodiment of the present invention.

Reference will now be made in detail to the embodiments of the present invention, examples of which are illustrated in the accompanying drawings, wherein like reference numerals refer to like elements throughout. The embodiments are described below in order to explain the present invention by referring to the figures.

FIG. 1 is a perspective view of a portable computer according to an embodiment of the present invention. Referring to FIG. 1, the portable computer according to this embodiment of the present invention comprises a main body 14 provided with a keyboard 16, a touch pad 18, etc., as an input device, and a display 10 hingedly attached to the main body 14 so as to open and close. The display is provided with a display panel 12 and a back-lit unit lighting the display panel 12.

Figure 2:
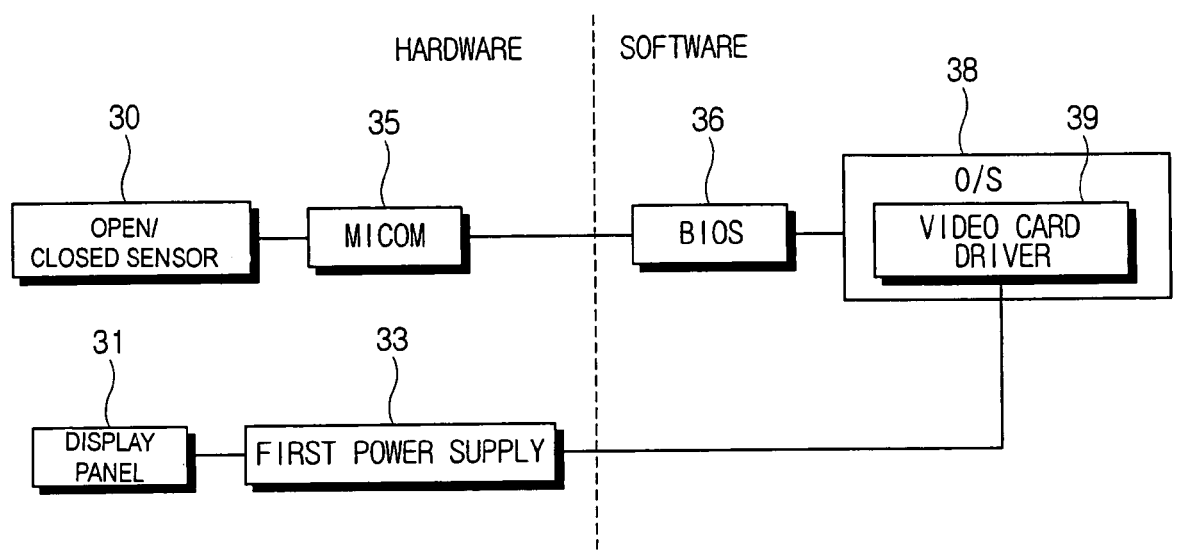
FIG. 2 is a block diagram illustrating a control of a portable computer according to an embodiment of the present invention.

FIG. 2 is a block diagram illustrating a control of a portable computer according to an embodiment of the present invention. Referring to FIG. 2, the portable computer according to this embodiment of the present invention comprises an open/closed sensor 30 to detect an open/closed state of the display 10 and to output an open/closed detection signal; a first power supply 33 to supply the driving power for a display panel 31; and a controller to identify a predetermined power state according to a closed detection signal from the open/closed sensor 30, to enter a low-power state if the power state is set to the low-power state, and to control the interruption of the driving power for the display panel 31 from the first power supply 33 if the power state is not set to the low-power state.

Further, the portable computer according to this embodiment of the present invention includes an inverter (not shown) to interrupt the driving power for the back-lit unit according to the closed detection signal from the open/closed sensor 30, and to supply the driving power for the back-lit unit according to an open detection signal from the open/closed sensor 30.

The open/closed sensor 30 may include a switch to turn on/off according to an open/closed state of the display 10, such that the switch controls the open/closed detection signal.

The first power supply 33 converts the electric power supplied from a DC adapter or a battery into the driving power for the display panel 31 (VDD) to be output to the display panel 31. The first power supply 33 may supply and interrupt the driving power for the display panel according to an inputted VDD_enable signal and an inputted VDD_disable signal, respectively.

The controller may include a MICOM 35, a BIOS 36, an O/S 38 having a power management program to enter the low-power state, and a video card driver 39.

When the display 10 of the portable computer is closed, the MICOM 35 transmits the closed detection signal from the open/closed sensor 30 to the O/S 38 through the BIOS 36. And the O/S 38 determines whether the power state is set to enter the low-power state, and places the portable computer into the low-power state if the power state is set to enter the low-power state.

However, if the power state is not set to enter the low-power state when the display 10 is closed, the video card driver 39, recognizing that the power state is not in the low-power state, may control the driving power for the display panel 31 from the first power supply 33 to be interrupted.

Accordingly, even if the power state is not set to enter the low-power state, the interruption of the driving power for the display panel 31, as well as the back-lit unit, occurs when the display 10 is closed, which allows the portable computer to use less electric power compared to the conventional portable computer.

Meanwhile, when the display 10 of the portable computer is changed from the closed state to the open state, the MICOM 35 transmits the open detection signal from the open/closed sensor 30 to the O/S 38 through the BIOS 36. The O/S 38 then determines whether the predetermined power state is in the low-power state. Thus, the O/S 38 brings the portable computer out of the low-power state and places the portable computer into an active state if the power state is in the low-power state. Alternatively, the video card driver 39 may control the supply of the driving power for the display panel 31, if the power state is not in the low-power state when the display 10 is opened.

Figure 3:
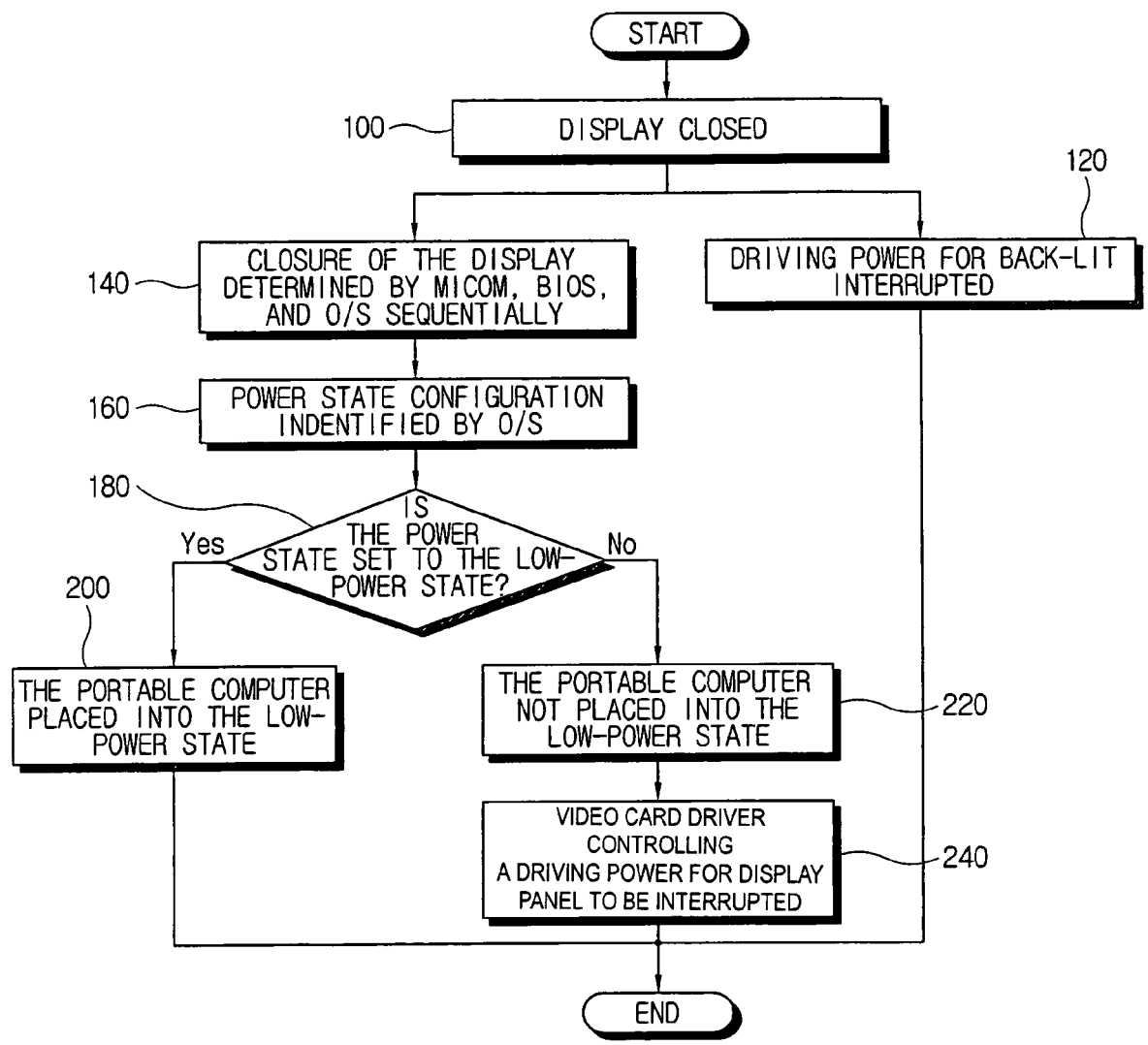
FIG. 3 is a flowchart illustrating a power control when the display of the portable computer is closed in FIG. 2.
Figure 4:
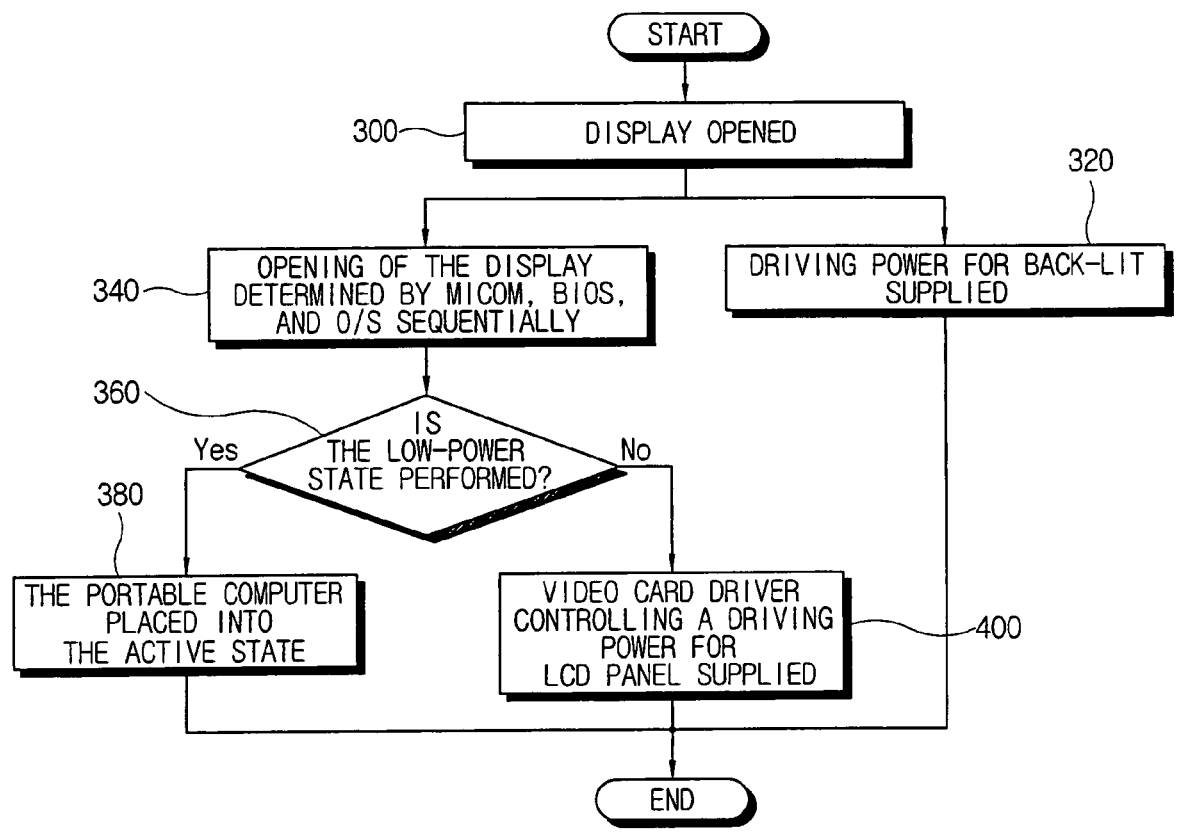
FIG. 4 is a flowchart illustrating a power control when the display of the portable computer is open in FIG. 2.

FIG. 3 is a flowchart illustrating a power control when the display of the portable computer is closed in FIG. 2, and FIG. 4 is a flowchart illustrating a power control when the display of the portable computer is opened in FIG. 2.

Referring to FIG. 3, at operation 100, the display 10 is closed, and at operation 120, as in the conventional portable computer, the driving power for the back-lit unit is interrupted.

Moreover, at operation 140 the MICOM 35, BIOS 36, and the O/S 38 sequentially determine whether the display 10 is closed. If the O/S 38 determines that the display 10 is closed, at operation 160 the O/S 38 determines whether the power state is set to enter the low-power state. Subsequently, the O/S 38 places the portable computer into the low-power state if the power state is set to enter the low-power state at operation 180 and 200.

However, if the power state is not set to enter the low-power state, the O/S 38 does not allow the portable computer to go into the low-power state at operation 180 and 220. Instead, at operation 240 the video card driver 39, recognizing that the power state is not in the low-power state, may control the driving power for the display panel 31 from the first power supply 33 to be interrupted.

Referring to FIG. 4, at operation 300, the display 10 of the portable computer is opened, and at operation 320 the driving power for the back-lit unit is supplied.

Moreover, at operation 340 the MICOM 35, BIOS 36, and the O/S 38 sequentially determine whether the display 10 is opened. If the O/S 38 determines that the display 10 is opened, the O/S 38 determines whether the predetermined power state is in the low-power state at operation 360. Subsequently, the O/S 38 brings the portable computer out of the low-power state and places the portable computer into the active state if the power state is in the low-power state at operation 380. Alternatively, at operation 400 the video card driver 39 may control the driving power for the LCD panel 31 to be supplied if the power state is not in the low-power state.

Figure 5:
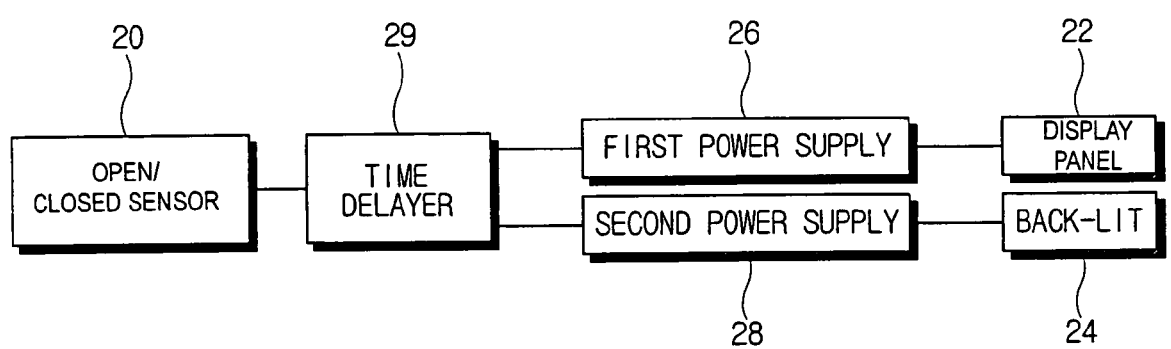
FIG. 5 is a block diagram illustrating a control of a portable computer according to another embodiment of the present invention.
Figure 6:
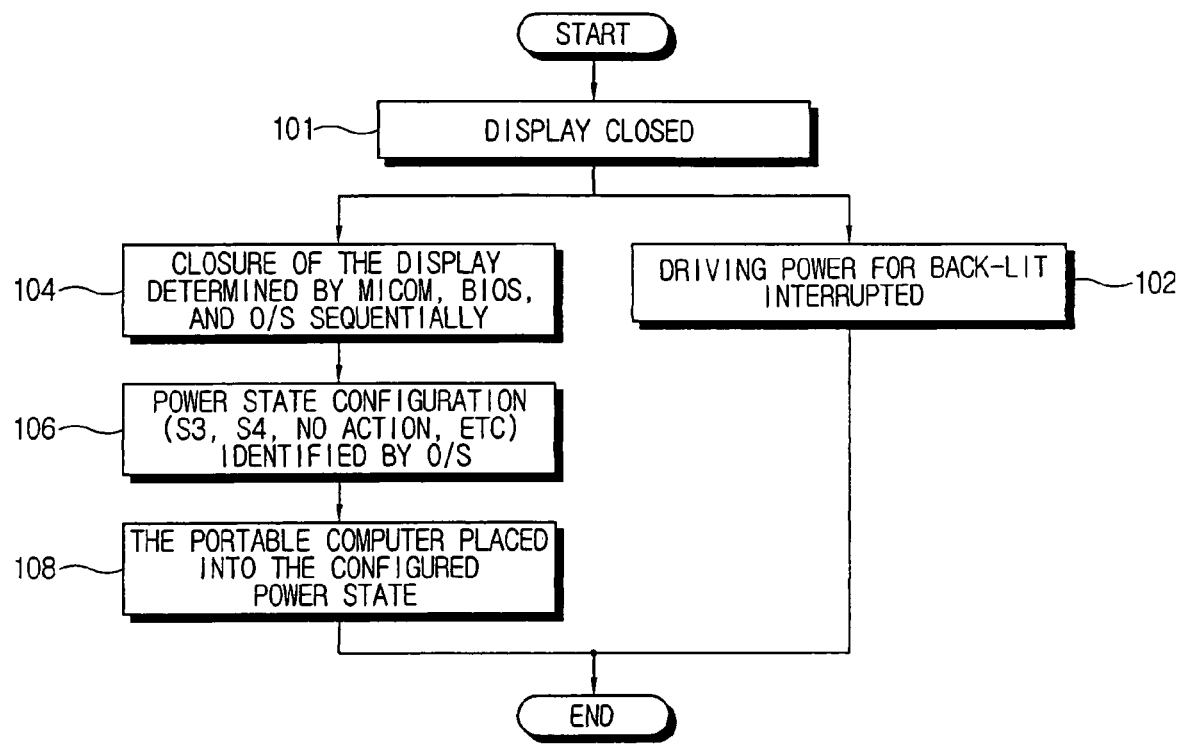
FIG. 6 is a flowchart illustrating a conventional power control when a display of a portable computer is closed.

FIG. 5 is a block diagram showing a control of a portable computer according to another embodiment of the present invention. Referring to FIG. 5, the portable computer according to this embodiment of the present invention comprises an open/closed sensor 20 to detect an open/closed state of the display 10 and output an open/closed detection signal; a first and a second power supply 26 and 28 to supply/interrupt the driving power for a display panel 22 and a back-lit unit 24, respectively; and a time delayer 29 to delay the open/closed detection signal from the open/closed sensor 20 and to output the delayed the open/closed detection signal.

The open/closed sensor 20 and the first power supply 26 operate in a similar manner to the previously discussed embodiment. Therefore, a discussion of their operation will be omitted.

The second power supply 28 includes an inverter to convert the electric power supplied from a DC adapter or a battery into a driving power for the back-lit unit 24. The second power supply 28 may supply and interrupt the driving power for the back-lit unit 24 according to an inputted BL_enable signal and an inputted BL_disable signal, respectively.

Herein, the VDD_enable signal and the BL_enable signal based on the open detection signal from the open/closed sensor 20 may be outputted to the first and the second power supplies 26 and 28, respectively. Similarly, the VDD_disable signal and the BL_disable signal based on the closed detection signal from the open/closed sensor 20 may be outputted to the first and the second power supplies 26 and 28, respectively.

Accordingly, in a case in which the closed detection signal is outputted from the open/closed sensor 20, the driving power for the display panel 22 and the driving power for the back-lit unit 24 are interrupted. Conversely, in a case in which the open detection signal is outputted from the open/closed sensor 20, the interrupted driving powers are again supplied to the display panel 22 and the back-lit unit 24.

Therefore, the present invention can achieve the interruption of the power supply to the display panel by outputting the open/closed detection signal of the open/closed sensor 20 directly to the first and the second power supplies 26 and 28 (i.e. by hardware) in a case in which the power state is not set to enter the low-power state, rather than the first and the second power supplies 26 and 28 being controlled by the O/S running the power management program therein (i.e. by software).

The time delayer 29 transmits the closed detection signal to the second power supply 28 and the first power supply 26 sequentially when the closed detection signal is outputted from the open/closed sensor 20. That is, the time delayer 29 delays the closed detection signal for a predetermined first time interval, so as to output the delayed closed detection signal to the first power supply 26 after outputting the closed detection signal to the second power supply 28.

Also, the time delayer 29 transmits the open detection signal to the first power supply 26 and the second power supply 28 sequentially when the open detection signal is outputted from the open/closed sensor 20. That is, the time delayer 29 delays the open detection signal for a predetermined second time interval, so as to output the delayed open detection signal to the second power supply 28 after outputting the closed detection signal to the first power supply 26.

With this configuration, the present invention may interrupt the driving power for the back-lit unit 24 and the driving power for the display panel 22 sequentially when the display 10 is closed, and may supply the driving power for the display panel 22 and the driving power for the back-lit unit 24 sequentially when the display 10 is open, which minimizes or eliminates a white screen, that is, when the screen display appears totally white in color, and/or screen flicker, etc.

As described above, the portable computer, and controlling method thereof, according to the present invention interrupts the driving power for the display panel when the display is closed even if the low-power state is not set, and reduces the power use compared to the conventional portable computer.

Although a few embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A portable computer having a main body and a display panel hingedly attached to the main body, the portable computer reducing power use by using at least a low-power state where power to components of the portable computer, including the display panel and a light unit of the display panel, are interrupted upon closing of the display panel, and a non-low-power state where power to the light unit is selectively interrupted upon closing of the display panel without setting of a ceasing of power to the display panel, comprising:
   an open/closed sensor to output open and closed detection signals in response to the display panel being open and closed, respectively;
   a power supply to supply a driving power to the display panel; and
   a controller to identify a predetermined power state in response to receiving the closed detection signal from the open/closed sensor, and to selectively control the driving power to the display panel to be interrupted in response to the display panel being closed and the power state not being set to the low-power state,
   wherein the controller comprises a video card driver to control the driving power to the display panel to be interrupted in response to the power state not being set to the low-power state.

2. The portable computer according to claim 1, further comprising:
   a back-lit unit, as the light unit, to receive a back-lit unit driving power and light the display panel; and
   an inverter to interrupt the back-lit unit driving power in response to the closed detection signal from the open-closed sensor.

3. The portable computer according to claim 2, wherein the inverter supplies the back-lit unit driving power in response to the open detection signal from the open/closed sensor.

4. The portable computer according to claim 1, wherein the controller comprises a MICOM, a BIOS, and an O/S having a power management program.

5. The portable computer according to claim 4, wherein the MICOM transmits the open/closed detection signals from the open/closed sensor to the O/S through the BIOS.

6. The portable computer according to claim 4, wherein the O/S determines whether the power state is set to enter the low-power state, and sets the low-power state in response to the power state being set to enter the low-power state.

7. The portable computer according to claim 6, wherein the O/S sets the power state to an active state in response to receiving the open detection signal and the power state being set to the low-power state.

8. The portable computer according to claim 1, wherein the video card driver controls the driving power the display panel to be supplied in response to receiving the open detection signal and the power state not being set to the low-power state.

9. A portable computer having a main body and a display panel hingedly attached to the main body, the portable computer reducing power use by using at least a low-power state where power to components of the portable computer, including the display panel and a light unit of the display panel, are interrupted upon closing of the display panel, and a non-low-power state where power to the light unit is selectively interrupted upon closing of the display panel without setting of a ceasing of power to the display panel, comprising:

an open/closed sensor to output open and closed detection signals in response to the display panel being open and closed, respectively;

a power supply to supply a driving power to the display panel; and a controller to identify a predetermined power state in response to receiving the closed detection signal from the open/closed sensor, and to selectively control the driving power to the display panel to be interrupted in response to the display panel being closed and the power state not being set to the low-power state, wherein the controller comprises a video card driver to control the driving power to the display panel to be interrupted in response to the power state not being set to the low-power state, wherein the controller controls the driving power to the display panel to be supplied in response to receiving the open detection signal from the open/closed sensor and the power state not being set to the low-power state.

10. A method of controlling a portable computer having a main body and a display panel hingedly attached to the main body, the portable computer reducing power use by using at least a low-power state where power to components of the portable computer, including the display panel and a light unit of the display panel, are interrupted upon closing of the display panel, and a non-low-power state where power to the light unit is selectively interrupted upon closing of the display panel without setting of a ceasing of power to the display panel, the method comprising:

determining whether the display panel is closed or open;
identifying a predetermined power state in response to the display panel being closed; and
selectively interrupting the supply of a driving power to the display panel in response to the display panel being closed and the power state not being set to the low-power state, wherein the selectively interrupting of the supply of a driving power to the display panel comprises controlling the driving power to the display panel to be interrupted in response to the power state not being set to the low-power state using a video card driver.

11. A method of controlling a portable computer having a main body and a display panel hingedly attached to the main body, the portable computer reducing power use by using at least a low-power state where power to components of the portable computer, including the display panel and a light unit of the display panel, are interrupted upon closing of the display panel, and a non-low-power state where power to the light unit is selectively interrupted upon closing of the display panel without setting of a ceasing of power to the display panel, the method comprising:

determining whether the display panel is closed or open;
identifying a predetermined power state in response to the display panel being closed,
selectively interrupting the supply of a driving power to the display panel in response to the display panel being closed and the power state not being set to the low-power state;

determining whether the power state is set to the low-power state in response to the display being determined to be open; and supplying the driving power to the display panel in response to the power state not being set to the low-power state, wherein the selectively interrupting of the supply of a driving power to the display panel comprises controlling the driving power to the display panel to be interrupted in response to the power state not being set to the low-power state using a video card driver.

12. A portable computer having a main body and a closable display panel attached to the main body, the portable computer reducing power use by using at least a low-power state where power to components of the portable computer, including the display panel and a light unit of the display panel, are interrupted upon closing of the display panel, and a non-low-power state where power to the light unit is selectively interrupted upon closing of the display panel without setting of a ceasing of power to the display panel, comprising:

an open/closed sensor to determine whether the display panel is open or closed; and a controller to selectively interrupt a display panel driving power supply upon to the display panel being closed and the portable computer not being in the low-power state, wherein the controller comprises a video card driver to control the driving power to the display panel to be interrupted in response to the power state not being set to the low-power state.

13. A method of controlling a portable computer having a main body and a closable display panel attached to the main body, the portable computer reducing power use by using at least a low-power state where power to components of the portable computer, including the display panel and a light unit of the display panel, are interrupted upon closing of the display panel, and a non-low-power state where power to the light unit is selectively interrupted upon closing of the display panel without setting of a ceasing of power to the display panel, the method comprising:

determining whether the display panel is closed; and
selectively interrupting a display panel driving power supply upon to the display panel being closed and the portable computer not being in the low-power state, wherein the selectively interrupting of the display panel driving power supply comprises controlling the driving power to the display panel to be interrupted in response to the power state not being set to the low-power state using a video card driver.

14. A computer reducing power use by implementing a set power state, including at least a defined low-power state where power to components of the computer, including a display panel and a back-lit unit of the display panel, are interrupted upon a closing of the display panel from an open position, and a defined non-low-power state where power to the back-lit unit is selectively interrupted upon the closing of the display panel without setting of a ceasing of power to the display panel, comprising:

a power supply to supply a driving power to the display panel based upon the set power state of the computer to enter upon the closing of the display panel; and a controller selectively controlling the driving power to the display panel to be interrupted upon the display panel being closed and while the power state of the computer is not set to enter the low-power state upon closure of the display panel, wherein the controller comprises a video card driver to control the driving power to the display panel to be interrupted in response to the power state not being set to the low-power state.

15. The computer of claim 14, wherein the controller is a video controller to drive the display panel.

* * * * *

UNITED STATES PATENT AND TRADEMARK OFFICE
CERTIFICATE OF CORRECTION

PATENT NO. : 7,719,528 B2 Page 1 of 1
APPLICATION NO. : 10/930946
DATED : May 18, 2010
INVENTOR(S) : Sung-eun Lee It is certified that error appears in the above-identified patent and that said Letters Patent is hereby corrected as shown below:

Column 7, Line 67, change "closed," to --closed;--.

Signed and Sealed this

Thirty-first Day of August, 2010

David J. Kappos
*Director of the United States Patent and Trademark Office*